United States Patent
Saucedo

(10) Patent No.: US 7,841,466 B2
(45) Date of Patent: Nov. 30, 2010

(54) SURFBOARD SEPARATING DEVICE

(75) Inventor: John J. Saucedo, Lakeside, MT (US)

(73) Assignee: Done Right, LLC, Lakeside, MT (US)

( * ) Notice: Subject to any disclaimer, the term of this patent is extended or adjusted under 35 U.S.C. 154(b) by 793 days.

(21) Appl. No.: 11/759,740

(22) Filed: Jun. 7, 2007

(65) Prior Publication Data

US 2008/0302685 A1 Dec. 11, 2008

(51) Int. Cl.
*B65D 85/00* (2006.01)
(52) U.S. Cl. .................. 206/315.1; 206/522; 206/523; 150/154; 150/52 R
(58) Field of Classification Search .............. 206/315.1, 206/522, 523; 150/154, 52 R; 224/901
See application file for complete search history.

(56) References Cited

U.S. PATENT DOCUMENTS

| | | | | | |
|---|---|---|---|---|---|
| 4,238,063 A | * | 12/1980 | O'Dair | .................... | 206/315.1 |
| 4,483,380 A | * | 11/1984 | Beran | ....................... | 206/315.1 |
| 4,719,952 A | * | 1/1988 | Geronimo | ................ | 206/315.1 |
| 4,895,173 A | * | 1/1990 | Brault et al. | ................ | 128/870 |
| 5,033,497 A | * | 7/1991 | Hernandez | ................... | 135/95 |
| 5,066,044 A | * | 11/1991 | Adasek | ........................ | 280/815 |
| 5,094,344 A | * | 3/1992 | Savage | .................... | 206/315.1 |
| 5,163,550 A | * | 11/1992 | Hawk | ...................... | 206/315.1 |
| 5,282,535 A | * | 2/1994 | Rowland | .................. | 206/315.1 |
| 5,285,942 A | * | 2/1994 | Wills | ........................... | 224/328 |
| 5,405,002 A | * | 4/1995 | Troia | ....................... | 206/315.1 |
| 5,967,314 A | * | 10/1999 | McGovern | ............... | 206/315.1 |
| 6,334,537 B1 | * | 1/2002 | Tepper | ........................ | 206/522 |
| 7,374,207 B2 | * | 5/2008 | McCoy | ..................... | 280/815 |
| 2004/0134955 A1 | * | 7/2004 | Williams | .................... | 224/644 |
| 2004/0178243 A1 | * | 9/2004 | Clark et al. | ................. | 224/314 |
| 2006/0283532 A1 | * | 12/2006 | Ibanez | ........................ | 150/154 |

* cited by examiner

*Primary Examiner*—Anthony Stashick
*Assistant Examiner*—Cynthia F Collado
(74) *Attorney, Agent, or Firm*—Stetina Brunda Garred & Brucker

(57) ABSTRACT

A surfboard separator for allowing a user to stack two surfboards on top of each other during the transport of the surfboards to a prescribed destination. The separator is operative to separate a first surfboard from a second surfboard stacked thereon, and to further create a padded interface therebetween. The separator is connectable to the first surfboard and comprises an elongate strap having opposed first and second ends. The separator further comprises at least one pad connected to the strap. The pad is disposed against a lower surface of the first surfboard when the separator is connected to the first surfboard. The separator also includes an attachment assembly connected to the strap. The attachment assembly comprises first and second connectors which are releasably attachable to each other to facilitate the engagement of the separator to the first surfboard.

20 Claims, 2 Drawing Sheets

SURFBOARD SEPARATING DEVICE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to storage devices and more particularly, to a surfboard separator which is adapted to safeguard surfboards during the transport thereof in a stacked arrangement.

2. Description of the Related Art

It is well known that different surfboards offer different surfing experiences. For instance, shorter surfboards generally enable more maneuverability while surfing, while longer boards may be better suited for simply catching waves. Therefore, surfers often want to bring at least two surfboards with them to their surfing destination so they have the option of selecting a surfboard depending on the surf conditions at a particular destination. Surfers may also bring a backup surfboard in the event that their primary surfboard sustains damage.

Although it is desirable to have multiple surfboards available at a surfing spot, the transport more than one surfboard to a particular destination is often a difficult process for many surfers. Many surfboards are too long to fit into an average sized vehicle. Therefore, many surfers install roof racks on top of their vehicle for surfboard transport. Although a roof rack provides a means for transporting a surfboard, complications may arise if the surfer decides to bring two surfboards. Many racks are not wide enough to lay the surfboards side-by-side. Therefore, surfers have resorted to stacking their surfboards on top of one another.

Simply stacking one surfboard on top of the other is undesirable as it is likely to cause damage to each of the surfboards. In particular, the surfboards bump and rub against each other, thereby causing scratches and gouges thereon. Such scratches and gouges diminish the aesthetic quality of the surfboard; however, they may also affect the performance of the surfboard. They may slow down a surfboard, making paddling and turning more difficult. Consequently, surfers have placed various items including towels and wetsuits between their surfboards for protection.

Although towels and wetsuits may offer some protection, there are many disadvantages to employing such items to protect surfboards during transport. One disadvantage is that the towel or wetsuit may not be securely fastened to the surfboard. Consequently, it may slip out during transport, leaving nothing between the two surfboards. Another disadvantage is that it may take a considerable amount of time to situate the wetsuit or towel between the surfboards to minimize the likelihood that it may slip out during transport. A further drawback is that the towel or wetsuit may sustain damage during the trip. For instance, wind may rip or tear the towel or wetsuit.

As is apparent from the foregoing, there exists a need in the art for a surfboard separator and a method of using the same to enable a surfer to stack one surfboard on top of another during transport to a surfing destination. The present invention address this particular need, as will be discussed in more detail below.

BRIEF SUMMARY OF THE INVENTION

According to an aspect of the present invention, there is provided a surfboard separator for allowing a user to stack two surfboards on top of each other during the transport of the surfboards to a prescribed destination. The surfboard separator is operative to separate a first surfboard from a second surfboard stacked thereon, and to further create a padded interface therebetween. Both the first and second surfboards define opposed upper and lower surfaces. The surfboard separator is connectable to the first surfboard and comprises an elongate strap having opposed first and second ends. The separator further comprises at least one pad connected to the strap. The pad is disposed against the lower surface of the first surfboard when the separator is connected to the first surfboard. The separator also includes an attachment assembly connected to the strap. The attachment assembly comprises a first connector permanently attached to the first end of the strap and a second connector adjustably attached to the strap in relative close proximity to the second end thereof. The first and second connectors of the attachment assembly are releasably attachable to each other to facilitate the engagement of the separator to the first surfboard. The position of the second connector upon the strap is selectively adjustable to enable a user to fit the strap onto a variety of surfboards that vary in width. The strap may be secured to the first surfboard by cinching the strap about the width of the first surfboard.

The surfboard separator may include an attachment assembly guard connected to the strap. The attachment assembly guard is oriented on the strap so as to be disposed between the interconnected first and second connectors of the attachment assembly and the first surfboard to prevent the attachment assembly from rubbing against or scratching the surface of the first surfboard.

The surfboard separator may additionally include a loop defined by a prescribed portion of the strap. The loop aids a user in cinching the strap around the first surfboard. The user inserts a thumb or other finger from one hand into the loop, while at the same time pulling the second end of the strap with the other hand. The force exerted against the strap by the thumb within the loop resists the undesirable rotation of the separator relative to the surfboard which could otherwise occur when the second end of the strap is pulled to facilitate the tightening or cinching of the strap about the first surfboard. Typically, two separators constructed in accordance with the present invention will be cooperatively engaged to the first surfboard in spaced relation to each other. Thereafter, a second surfboard may be stacked upon the first surfboard, and more particularly upon the pads of the separators. If a third surfboard is to be included in the stack, a pair of the separators of the present invention may be cooperatively engaged to the second surfboard in the same manner as the first surfboard.

According to another aspect of the present invention, there is provided of method of using the surfboard separator to stack surfboards on top of a vehicle. The vehicle includes a roof rack having a pair of brackets separated by a first distance. The method includes the initial step of providing a pair of surfboard separators and securing the separators to the first surfboard. The separators are secured to the first surfboard such that the pad(s) of each separator is/are disposed on the lower surface of the first surfboard. The surfboard separators are preferably spaced from each other on the first surfboard by a distance which is roughly equal to the first distance between the roof rack brackets. The first surfboard is then placed on the roof rack such that the lower surface is upwardly facing. The second surfboard is subsequently placed on top of the first surfboard such that the lower surface of the second surfboard is also upwardly facing, the upper surface of the second surfboard thus being directly abutted against the pad(s) of each of the separators engaged to the lower first surfboard in the stack. The method may additionally include the step of securing the stacked first and second surfboard to the roof rack. The surfboards may be secured to the roof rack using a bungee cord, rope or similar securing devices.

The surfboard separator of the present invention provides a quick and effective means of separating two surfboards so they are safely transported to a surfing destination. The separation and padded interface provided by the surfboard separator prevents the two surfboards from bumping or scratching each other. A rough surface may inhibit the performance of the surfboard. Therefore, the present invention aims at ensuring that the two surfboards arrive at the surfing destination in peak riding condition.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
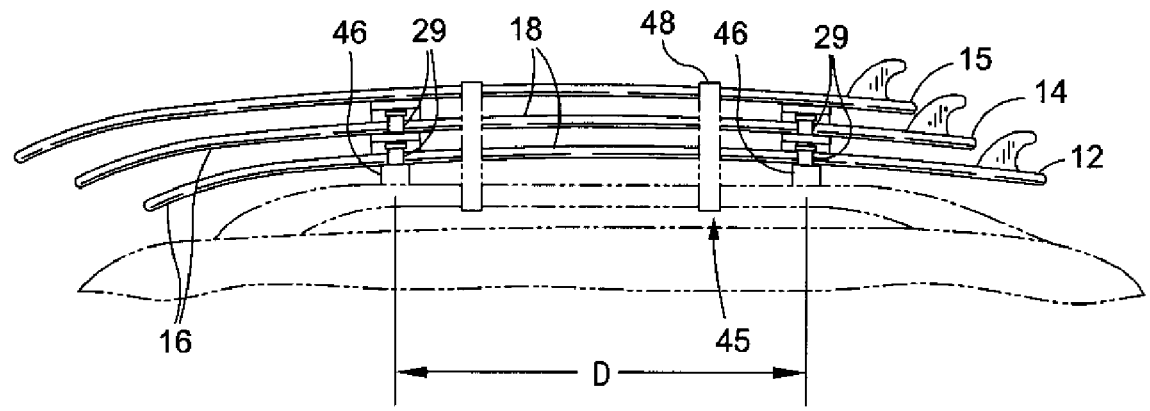
FIG. 1 is a side elevational view of three surfboards stacked on top of a vehicular roof rack wherein each adjacent pair of the surfboards is separated by at least one surfboard separator constructed in accordance with the present invention.
Figure 2:
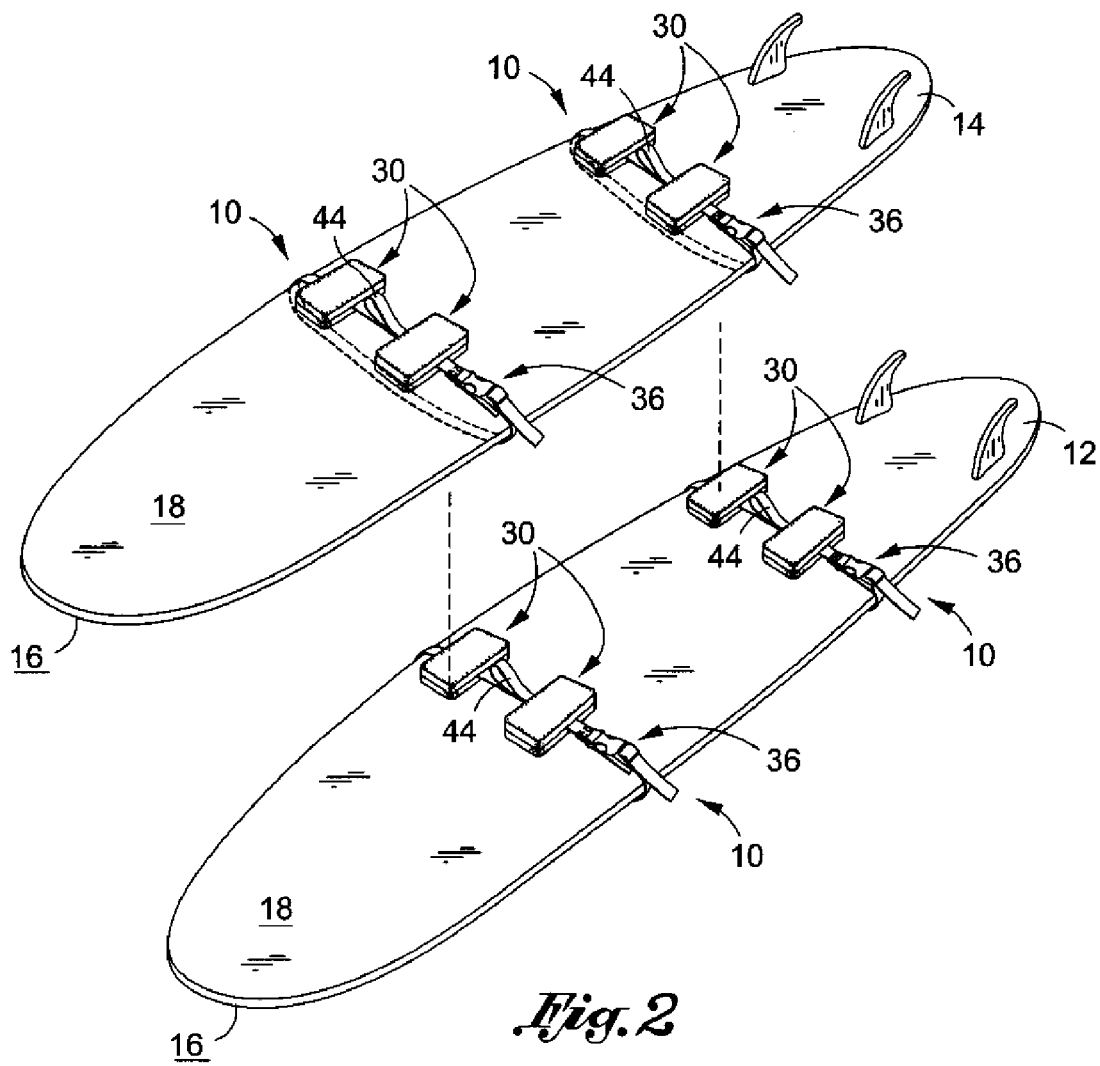
FIG. 2 is a top exploded view of the lower two surfboards of the stack shown in FIG. 1, each surfboard having a pair of the surfboards separators of the present invention attached thereto.
Figure 3:
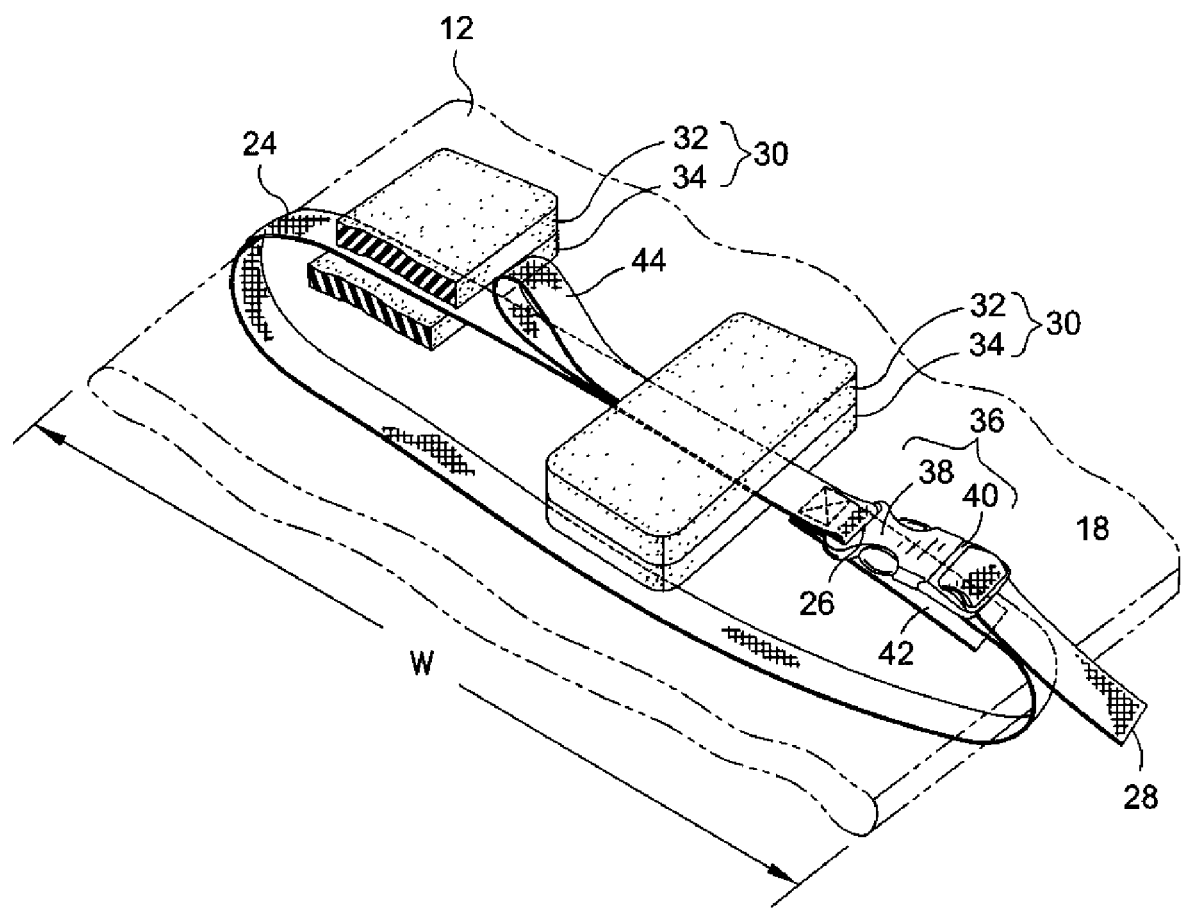
FIG. 3 is a top perspective view of one of the surfboard separators shown in FIGS. 1 and 2 as operatively connected to one of the stacked surfboards.

Referring now to the drawings wherein the showings are for purposes of illustrating a preferred embodiment of the present invention only, and not for purposes of limiting the same, FIGS. 1-3 depict a surfboard separator 10 constructed in accordance with the present invention. It is contemplated that the surfboard separator 10 may be used to stack two, three, or more surfboards on top of each other. FIG. 1 depicts a stack wherein a first surfboard 12 includes a pair of the separators 10 operatively coupled thereto, the first surfboard 12 having a second surfboard 14 stacked thereon. The second surfboard 14 also has a pair of the separators 10 of the present invention operatively connected thereto. A third surfboard 15 is also depicted in FIG. 1 as being stacked upon the second surfboard 14. However, in the description below, the separator 10 will be described only in terms of its use in stacking the second surfboard 14 upon the first surfboard 12. However, those of ordinary skill in the art will recognize that the discussion regarding the stacking of the first and second surfboards 12, 14 on each other through the use of the separator 10 is also applicable to the stacking of the third surfboard 15 upon the second surfboard 14 in the event the third surfboard 15 is included in the stack. The same discussion would also be applicable to the stacking of a fourth surfboard upon the third surfboard 15, etc.

Both of the first and second surfboards 12, 14 define opposed upper and lower surfaces 16, 18. The lower surface 18 of each of the surfboards 12, 14 is that surface including the fin(s) disposed thereon as shown in FIGS. 1 and 2. It is contemplated that in using the separator 10 of the present invention to facilitate the stacking of the second surfboard 14 upon the first surfboard 12, a pair of the separators 10 will be cooperatively engaged to the lower first surfboard 12 of the stack in spaced relation to each other in the manner shown in FIGS. 1 and 2. The structural and functional attributes of each separator 10 of the pair cooperatively engaged to the first surfboard 12 of the stack will also be described below.

Each surfboard separator 10 of the pair comprises an elongate, flexible strap 24 which defines a first end 26 and an opposed second end 28. The strap 24 is preferably fabricated from strong, durable material capable of withstanding the wear and tear associated with the contemplated use of the separators 10. For example, the strap 24 may be fabricated of woven nylon, though other similar materials known by those of ordinary skill in the art may also be employed in the fabrication thereof.

In addition to the strap 24, each separator 10 comprises at least one, and preferably a pair of generally rectangular pads 30 which are disposed on the strap 24 in spaced relation to each other. As best shown in FIG. 3, each pad 30 is preferably comprised of first and second pad sections 32, 34 which are rigidly attached to each other. In one embodiment of the present invention, each pad 30 is attached to the strap by securing the first and second pad sections 32, 34 to each other subsequent to the extension of a prescribed portion of the strap 24 therebetween. In each pad 30, the first and second pad sections 32, 34 are preferably secured to each other through the use of a suitable adhesive, though differing attachment methods are contemplated to be within the spirit and scope of the present invention. The strap 24 is not adhesively secured to either of the first and second sections 32, 34 of each of the pads 30. As a result, each of the pads 30 is adjustably positionable along the strap 24 to allow for variations in the spacing therebetween for purposes of accommodating surfboards of differing widths.

Though each pad 30 is preferably slidably connected to the strap 24, those of ordinary skill in the art will recognize that each pad 30 may alternatively be rigidly attached to the strap 24 so at to be maintained in one prescribed location thereon. Additionally, though each pad 30 is preferably fabricated from the first and second pad sections 32, 34 secured to each other in the aforementioned manner, it is further contemplated that each pad 30 may comprise a unitary structure which has a suitable slot or opening formed therein to allow for the advancement of the strap 24 therethrough. In addition, though each pad 30 as shown in FIGS. 2 and 3 has a generally quadrangular (e.g., rectangular) configuration, those of ordinary skill in the art will recognize that other shapes and sizes for the pads 30 are contemplated to be within the spirit and scope of the present invention. In this regard, the pads 30 may vary in size, provided that they provide a sufficient level of separation between the stacked surfboards 12, 14 as needed to prevent damage thereto. Each pad 30 is also preferably constructed of a durable, foam-like material that is capable of supporting the weight of the second surfboard 14 and further has resilient properties to allow the pads 30 to act as shock absorbers during the transport of the stacked first and second surfboards 12, 14.

Each separator 10 of the present invention further comprises an attachment assembly 36 which is connected to the strap 24. As is best shown FIG. 3, the attachment assembly 36 comprises a female connector 38 which is permanently attached to the first end 26 of the strap 24. In addition to the female connector 38, the attachment assembly 36 comprises a male connector 40 which is adjustably mounted to the strap 24 in relative close proximity to the second end 28 thereof. The male and female connectors 40, 38 are releasably attachable to each other in the manner shown in FIGS. 2 and 3. Those of ordinary skill in the art that alternative types of connectors other than for the male and female connectors 40, 38 shown in FIGS. 2 and 3 are contemplated to be within the spirit and scope of the present invention. In the separator 10, the position of the male connector 40 upon the strap 24 may be selectively varied as needed to separate the same from the female connector 38 by a distance which is suited to accommodate the width of the surfboard with which the separator 10 is to be used.

As best seen in FIG. 3, in attaching each separator 10 to the first surfboard 12, the strap 24 of the separator 10 is wrapped about the width W of the first surfboard 12 such that the pads 30 thereof are each abutted against the lower surface 18 of the first surfboard 12. Thereafter, the female and male connectors 38, 40 of the attachment assembly 36 of the separator 10 are operatively coupled to each other. The strap 24 is then cinched or tightened about the first surfboard 12 by grasping a portion of the strap 24 adjacent the second end 28 in one hand of the user and pulling the same as needed to effectively decrease the length of the strap 24 between the male and female connectors 40, 38. During the cinching of the strap 24 in the aforementioned manner, the separator 10 may be caused to rotate upon the surfboard 12, thus altering the desired orientation of the pads 30 of separator 10 upon the lower surface 18. To prevent such undesirable rotation, the strap 24 preferably is formed to define a loop 44 which is oriented so as to extend between the pads 30. The loop 44 aids the user in cinching the strap 24 around the first surfboard 12. In this regard, the user is able to insert a thumb or other finger from one hand into the loop 44, while at the same time pulling the second end 28 of the strap 24 with the other hand. The force exerted against the strap 24 by the thumb of the user within the loop 44 resists the undesirable rotation of the separator 10 relative to the first surfboard 12 which could otherwise occur when the second end 28 of the strap 24 is pulled to facilitate the tightening or cinching of the strap 24 about the first surfboard 12.

Each surfboard separator 10 further preferably comprises an attachment assembly guard 42 which is connected to the strap 24. The guard 42 comprises an elongate strip or flap of material which is attached to the strap 24 and oriented thereon so as to be disposed between the interconnected female and male connectors 38, 40 of the attachment assembly 36 and the lower surface 18 of the first surfboard 12 in the manner also best shown in FIG. 3. As such, the guard 42 prevents the female and male connectors 38, 40, which are each typically fabricated form a rigid plastic material, from rubbing against or otherwise scratching the lower surface 18 of the first surfboard 12. It is contemplated that the flap of material used to form the guard 42 will be fabricated from the same material used to fabricate the strap 24, one such exemplary material being woven nylon.

Though not shown, it is contemplated that in accordance with another embodiment of the present invention, the above-described strap 24 may be substituted with a continuous elastomeric band. As will be recognized, such elastomeric band will not include separate first and second ends, or the above-described attachment assembly 36 used in conjunctions with the strap 24. Rather, the elastomeric band would be configured such that the same may be expanded, and thereafter elastically constricted about the width W of the first surfboard 12 once advanced thereover.

In using the surfboard separator 10 of the present invention, as indicated above, such usage preferably involves the cooperative engagement of a pair of the separators 10 to the first surfboard 12 in spaced relation to each other and in the manner described above. Once a pair of the separators 10 is attached to the first surfboard 12, such first surfboard 12 is placed upon the top of the vehicle for transport to the surfing destination. The vehicle preferably includes a roof rack 45 upon which the first surfboard 12 having the separators 10 operatively coupled thereto is placed. Roof racks 45 as known in the art typically include a pair of brackets 46 which are separated by a first distance D as shown I FIG. 1. Though not necessarily required, the separators 10 are preferably secured to the first surfboard 12 so as to be separated from each other by a distance roughly equal to the distance D separating the brackets 46 of the roof rack 45 from each other. As will be recognized, it is the upper surface 16 of the first surfboard 12 that is placed directly upon the brackets 46 of the roof rack 45, such that the lower surface 18 of the first surfboard 12 and pads 30 of the separators 10 abutted thereagainst are upwardly presented or facing.

Thereafter, the second surfboard 14 is stacked upon the underlying first surfboard 12 such that the upper surface 16 of the second surfboard 14 is brought into direct, abutting engagement to the pads 30 of the separators 10 attached to the lower first surfboard 12 of the stack. As a result, the pads 30 of the separators 10 are sandwiched between the first and second surfboards 12, 14. After the surfboards 12, 14 are stacked on each other, it is contemplated that such stacked surfboards 12, 14 will further be secured to the roof rack 45 through the use of tie downs 48 such as bungee cords, ropes, straps, ratcheting straps, and the like. The use of such tie downs 48 typically causes compressive pressure to be exerted against the pads 30 between the first and second surfboards 12, 14 as results in some measure of compression thereof. Such compression of the pads 30 provides the advantage of facilitating a shock absorbing effect during the transport of the stacked surfboards 12, 14. If the third surfboard 15 is to be included in the stack, the same process described above in relation to the outfitting of the first surfboard 12 with a pair of the separators 10 is completed in relation to the second surfboard 14, i.e., the second surfboard 14 is outfitted with a pair of separators 10 prior to the stacking thereof upon the first surfboard 12. Thereafter, the third surfboard 15 may be stacked upon the second surfboard 14 in the same manner in which the second surfboard 14 is stacked upon the first surfboard 12.

It is understood that many surfers transport their surfboards in a bag that fits around the surfboards. Sometimes, each surfboard is placed in a separate bag, and other times, multiple surfboards are placed in one bag. It is contemplated that the present invention may be used in conjunction with such bags. In the case of each surfboard being placed in a separate bag, the separators 10 may be attached to the outside of the bag containing the first surfboard 12. Once attached, the bag containing the second surfboard 14 can be placed on top of the separators 10. In the case of one bag containing multiple surfboards, the separators 10 may be placed on the first surfboard 12 before it is placed in the bag. After the first surfboard 12 is placed in the bag, the second surfboard 14 may be placed in the bag so that the pads 30 on the separators 10 are disposed between the first and second surfboards 12, 14 within the common bag. Once both surfboards 12, 14 are disposed within the bag, the bag may be sealed, and then secured to the roof rack 45.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A surfboard separator attachable to a first surfboard, the separator being operative to separate and create a padded interface between the first surfboard and a second surfboard stacked upon the first surfboard when attached to the first surfboard, the separator comprising:
   an elongate strap having opposed first and second ends;
   at least one pad slidably mounted to the strap, the pad being positionable against the first surfboard when the separator is connected thereto; and
   an attachment assembly connected to the strap and operative to maintain the strap in looped engagement about the first surfboard;
   the pad being positionable between the first and second surfboards when the second surfboard is stacked upon the first surfboard subsequent to the attachment of the separator to the first surfboard.

2. The separator of claim 1 wherein the attachment assembly comprises:
   a first connector attached to the strap adjacent the first end thereof; and
   a second connector attached to the strap between the first and second ends thereof, the second connector being releasably attachable to the first connector;
   at least one of the first and second connectors being movably mounted to the strap to allow for the selective adjustment in a length of the strap between the first and second connectors.

3. The separator of claim 2 wherein the first connector is permanently attached to the first end of the strap and the second connector is adjustably mounted thereto.

4. The separator of claim 3 wherein the first connector is a female connector and the second connector is a male connector.

5. The separator of claim 1 further comprising an attachment assembly guard connected to the strap, the attachment assembly guard being disposed between the attachment assembly and the first surfboard when the separator is connected thereto.

6. The separator of claim 1 wherein the strap further defines a loop which is sized and configured to accommodate a finger of a user's hand to assist the user in cinching the strap to the first surfboard.

7. The separator of claim 1 wherein the at least one pad is fabricated of a resilient, foam-like material.

8. The separator of claim 1 wherein the at least one pad comprises first and second pad sections adhesively secured to each other and having a portion of the strap extending therebetween.

9. The separator of claim 1 comprising a pair of pads slidably mounted to the strap in spaced relation to each other.

10. The separator of claim 9 wherein the strap further defines a loop which is disposed between the pads and is sized and configured to accommodate a finger of a user's hand to assist the user in cinching the strap to the first surfboard.

11. The separator of claim 9 wherein each of the pads comprises first and second pad sections adhesively secured to each other and having a portion of the strap extending therebetween.

12. The separator of claim 1 wherein the strap is fabricated from woven nylon.

13. A surfboard separator, comprising:
    an elongate strap having opposed first and second ends;
    at least two pads slidably mounted to the strap in spaced relation to each other, each of the pads being positionable against a surfboard when the separator is connected thereto;
    an attachment assembly connected to the strap and operative to maintain the strap in looped engagement about the surfboard; and
    an attachment assembly guard connected to the strap, the attachment assembly guard being disposed between the attachment assembly and the surfboard when the separator is connected thereto.

14. The separator of claim 13 wherein the strap further defines a loop which is disposed between the pads and is sized and configured to accommodate a finger of a user's hand to assist the user in cinching the strap to the surfboard.

15. The separator of claim 13 wherein each of the pads comprises first and second pad sections adhesively secured to each other and having a portion of the strap extending therebetween.

16. The separator of claim 13 wherein the attachment assembly comprises:
    a first connector attached to the strap adjacent the first end thereof; and
    a second connector attached to the strap between the first and second ends thereof, the second connector being releasably attachable to the first connector;
    at least one of the first and second connectors being movably mounted to the strap to allow for the selective adjustment in a length of the strap between the first and second connectors.

17. A surfboard separator attachable to a first surfboard, the separator being operative to separate and created a padded interface between the first surfboard and a second surfboard stacked upon the first surfboard when attached to the first surfboard, the separator comprising:
    an elongate strap having opposed first and second ends;
    at least a pair of pads connected to the strap in spaced relation to each other, the pads being positionable against the first surfboard when the separator is connected thereto; and
    an attachment assembly connected to the strap and operative to maintain the strap in looped engagement about the first surfboard;
    the pads being positionable between the first and second surfboards when the second surfboard is stacked upon the first surfboard subsequent to the attachment of the separator to the first surfboard.

18. The separator of claim 17 wherein each of the pads is slidably mounted to the strap.

19. The separator of claim 18 wherein each of the pads comprises first and second pad sections adhesively secured to each other and having a portion of the strap extending therebetween.

20. The separator of claim 17 wherein each of the pads comprises first and second pad sections adhesively secured to each other and having a portion of the strap extending therebetween.

* * * * *